United States Patent [19]
Fujii et al.

[11] Patent Number: 4,488,100
[45] Date of Patent: Dec. 11, 1984

[54] MOTOR CONTROLLER

[75] Inventors: Hiroshi Fujii, Funabashi; Akira Ishibashi, Tokyo; Kenji Nando, Funabashi, all of Japan

[73] Assignee: Hitachi, Ltd., Tokyo, Japan

[21] Appl. No.: 457,511

[22] Filed: Jan. 12, 1983

[30] Foreign Application Priority Data

Jan. 20, 1982 [JP] Japan .................................. 57-6115

[51] Int. Cl.³ .............................................. H02P 5/40
[52] U.S. Cl. ................................... 318/798; 318/806
[58] Field of Search ...................... 318/811, 798, 806; 307/73; 363/143

[56] References Cited

U.S. PATENT DOCUMENTS

| | | | |
|---|---|---|---|
| 4,099,109 | 7/1978 | Abbondanti | 318/811 |
| 4,295,189 | 10/1981 | Boys | 318/811 |
| 4,377,779 | 3/1983 | Plunkett | 318/811 |

Primary Examiner—David Smith, Jr.
Attorney, Agent, or Firm—Antonelli, Terry & Wands

[57] ABSTRACT

In recent years the induction motor speed has come to be controlled by changing the frequency and voltage of the commercial power supply by means of an invertor. The frequency of the commercial power supply, however, differs from country to country and even in the same country differs from region to region. If the motor controller designed for a supply frequency of $f_L$ is operated connected to the supply having a frequency $f_H$ higher than $f_L$, an overvoltage will result. Conversely, if the motor controller designed for a supply frequency of $f_H$ is connected to the supply with a frequency $f_L$ lower than $f_H$, then a sufficient torque cannot be obtained. To eliminate the above drawback, the present invention detects the input frequency of the motor controller and selects or calculates control constants in accordance with the detected value so as to enable stable operation even when the input frequency changes.

7 Claims, 9 Drawing Figures

MOTOR CONTROLLER

BACKGROUND OF THE INVENTION

1. Field of the Invention

The present invention relates to a motor controller with an inverter which is capable of controlling the output torque of a motor to be substantially constant even when the rotation speed varies at least in the low speed range.

2. Description of the Prior Art

An induction motor (hereinafter referred to as IM) has advantages of simple structure, low cost, long life and easy maintenance. Because of these merits an IM from small to large capacity has found wide use. However, since no effective method has been available to control the rotation speed efficiently, the application of an IM is relatively limited.

In recent years with various kinds of semiconductor devices available, a static inverter has been developed with which a desired frequency can easily be obtained. By connecting the inverter between the commercial power supply and the IM and changing the output frequency of the inverter, it is possible to control the speed of IM efficiently in wide range of speed.

Most of these inverters not only allow the output frequency to be varied to a desired value but also permit changing of output voltage. On the other hand, the IM is often required to gradually increase its speed to a predetermined value while maintaining the torque constant.

Thus, in the systems where the IM rotation speed is controlled by the inverter, the output voltage of the inverter is varied almost in proportion to the output frequency to control the rotation speed with the torque maintained constant.

Figure 1:
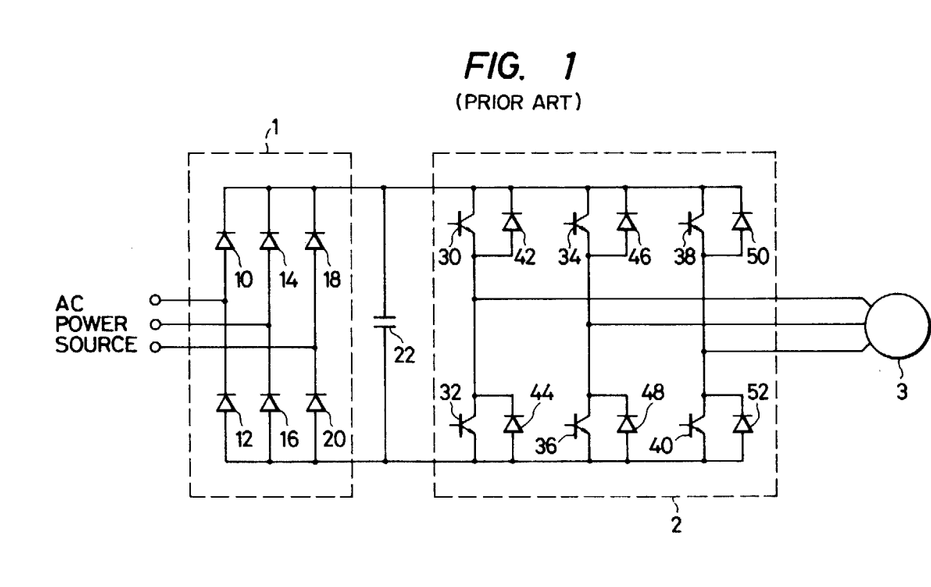
FIGS. 1 and 2 show the main circuit of conventional motor controller.

An example of such inverter is shown in FIG. 1.

In the figure, reference number 1 denotes a converter or rectifier unit to change the commercial alternating current into a direct current; 2 represents an inverter unit to obtain 3-phase ac current from the dc current; 3 represents an IM; 10 through 20 are diodes; 22 is a smoothing capacitor; 30 through 40 are switching devices such as transistors and gate turn-off thyristors; and 42 through 52 are freewheel diodes.

The diodes 10 through 20 rectify the input 3-phase ac current and supply the rectified dc current to the capacitor 22. Therefore, a smoothed out dc voltage is obtained across the capacitor 22.

The switching devices 30 through 40 are turned on or off by gate signals supplied from a switching control circuit not shown to convert the dc voltage appearing across the capacitor 22 into a 3-phase ac voltage as a supply to the IM 3. By controlling the gate signals it is possible to change the frequency and voltage of the 3-phase ac power, which in turn enables the control of the rotation speed at a desired value while maintaining the torque constant.

FIG. 1 is the case of a pulse width modulation (hereinafter referred to simply as PWM) invertor which provides a desired voltage by chopping the output voltage at the inverter unit 2 since the rectifier unit 1 has no voltage regulation function.

Figure 2:
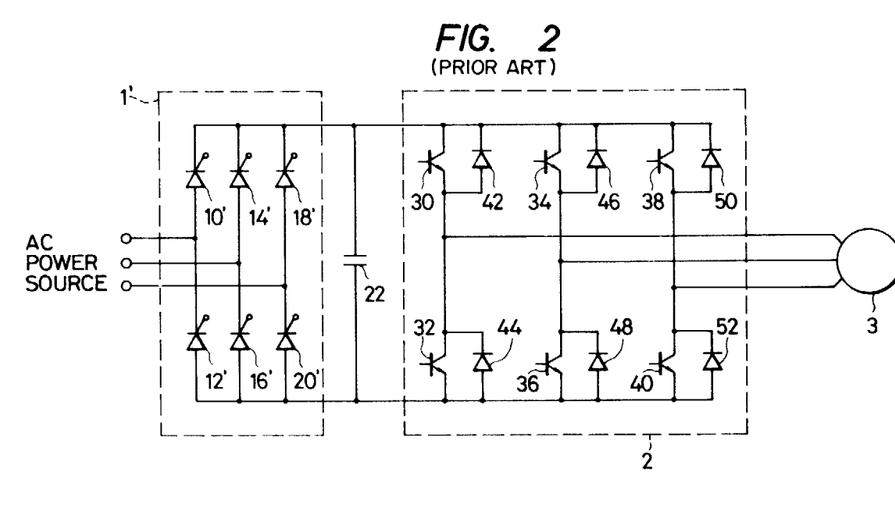

Shown in FIG. 2 is also a conventional inverter in which the rectifier unit 1' is formed of switching devices 10' through 20' such as thyristors or transistors and has a voltage regulation function. Thus the voltage to be applied to the motor 3 is controlled by the rectifier unit 1'. The voltage for the motor 3 can also be controlled by the combined use of the voltage chopping function of the inverter unit 2.

The relation between the inverter output frequency fo and the output voltage Vo is expressed as $$Vo = a \times fo + b \quad (1)$$

where a and b are constants. By controlling such that the above equation (1) is always satisfied, the rotation speed of IM can be controlled at a desired speed while maintaining the torque constant. Therefore, if the constants a and b in the equation (1) are set at required values in accordance with the maximum output frequency $fo_{max}$ or the upper limit of the variable range of the output frequency fo, the rotation speed of IM can be controlled in the range from a reasonably low speed to the rated speed with the torque maintained constant.

The conventional inverters, however, have some drawbacks. That is, when used in such a condition that the maximum output frequency differs from the set value, the inverters cannot fully demonstrate their performance or an overload will result. Hence when the input power supply frequency is different, the conventional inverter cannot be used, in other words it has poor interchangeability.

Figure 3:
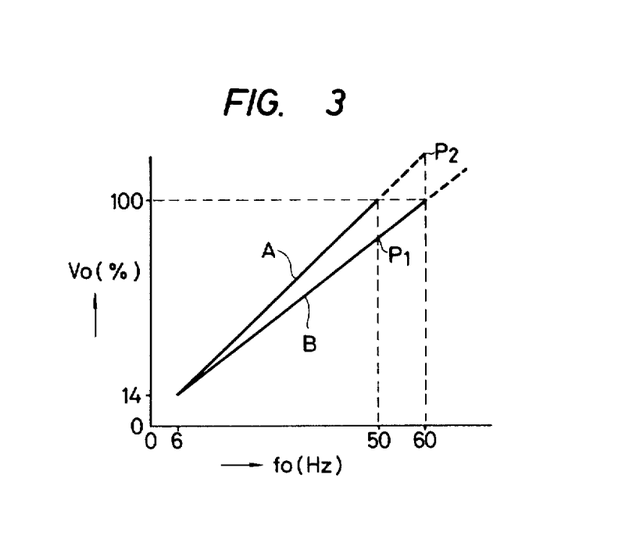
FIG. 3 is an output frequency versus output voltage characteristic diagram for the motor controller.

To meet the requirement of constant torque, the constants a and b of equation (1) must be changed according to the maximum output frequency. For instance, as shown in FIG. 3, the characteristic A for the maximum output frequency of 50 Hz must be made different from the characteristic B of the maximum output frequency of 60 Hz. The output voltage Vo of FIG. 3 is so determined that the voltage at the maximum output frequency is 100% of the rated voltage.

There are different power supply systems in different regions of the world and the power is supplied at 50 Hz in some regions and at 60 Hz in other regions. When the inverter set for the maximum output frequency of 60 Hz is used in the region where the power with 50 Hz is supplied, the torque of the IM does not reach the rated value of 100% as indicated by the point $P_1$ along the characteristic B. Conversely, when the inverter for 50 Hz is used in the region where 60 Hz is used, the torque of IM exceeds the rated value of 100% as indicated by the point $P_2$ along the characteristic A resulting in the overload of the inverter. In addition, the maximum speed may not reach the rated rotation speed.

As can be seen in the foregoing, the conventional motor controller has poor interchangeability, i.e., when the input frequency does not match it cannot be used.

SUMMARY OF THE INVENTION

An object of this invention is to provide a motor controller which overcomes conventional drawbacks and can be used if the input frequency changes.

Another object of this invention is to provide a motor controller which has little possibility of overloading if the input frequency changes.

Still another object of this invention is to provide a motor controller which can exhibit its capability to its fullest extent if the input frequency changes.

Other objects and related effects of this invention will become apparent from the following description.

In this invention, a means to detect the input frequency is provided and according to the output from the input frequency detection means the values of constants a and b are determined and substituted in the equation (1); then the inverter is controlled so as to satisfy the relation between the output frequency fo and the output voltage Vo as represented by the equation (1).

The constant a can be obtained from $$a = \frac{vc - b}{fi} \quad (2)$$

where Vc is the rated voltage of the motor and fi is an input frequency of the inverter.

Thus, with the rated voltage Vc and constant b set at appropriate values, the constant a can easily be determined by detecting the input frequency fi by the detection means. The constant b is a value required to pass the exciting current component and may be set constant regardless of the inverter frequency.

When the input frequency can be fixed to either 50 or 60 Hz, the constants a and b for each frequency are stored in a memory so that these constants can be selectively used according to the output of the detecting means.

Figure 4:
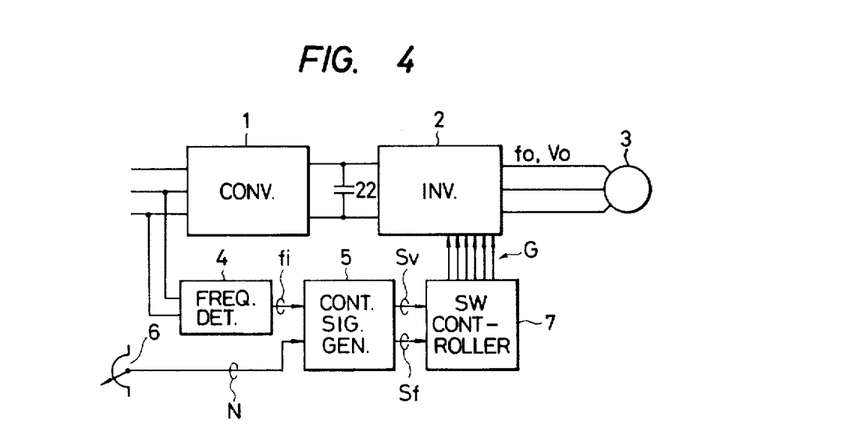
FIG. 4 is a block diagram of the motor controller embodying the present invention.

FIG. 4 is a block diagram showing schematically the basic structure of one embodiment of this invention, in which a converter or rectifier unit 1, an inverter 2, IM 3 and a smoothing capacitor 22 are identical to those of the conventional inverter as shown in FIG. 1. In this figure reference number 4 represents a frequency detecting circuit, 5 a control signal generator circuit, 6 a rotating speed setter, and 7 a switching control circuit.

The frequency detecting circuit 4 detects the frequency of the ac power being supplied, i.e., detects the input frequency and generates the input frequency signal fi.

The control signal generator circuit 5 takes in the rotation speed setting signal N as set by the speed setter 6 and the input frequency signal fi from the frequency detector circuit 4 to generate a frequency control signal Sf according to the signal N. At the same time the circuit 5 selects either characteristic A or B as shown in FIG. 3 and then according to the selected characteristic generates the voltage control signal Sv which corresponds to the output frequency fo represented by the signal Sf.

The switching control circuit 7 generates a gate signal G having appropriate timing and pulse width according to the frequency control signal Sf and the voltage control signal Sv and supplies the gate signal G to the switching devices 30-40 (see FIG. 1) of the inverter unit 2 to perform switching action thereby producing a 3-phase ac power which has output frequency fo and output voltage Vo according to the signal Sf and Sv and supplying the 3-phase power to the IM 3.

With this embodiment, it is possible to control the rotation speed of the IM 3 with the torque maintained constant by the speed setting signal N from the speed setter 6. That is, if the input frequency of the ac power changes either to 50 Hz or 60 Hz, the relation of output voltage Vo with respect to the output frequency fo is automatically switched over to either the characteristic A or B of FIG. 3, assuring optimum operation of the inverter which is used in the system supplied either with 50 or 60 Hz ac power. This enables correct control of the IM speed.

Figure 5:
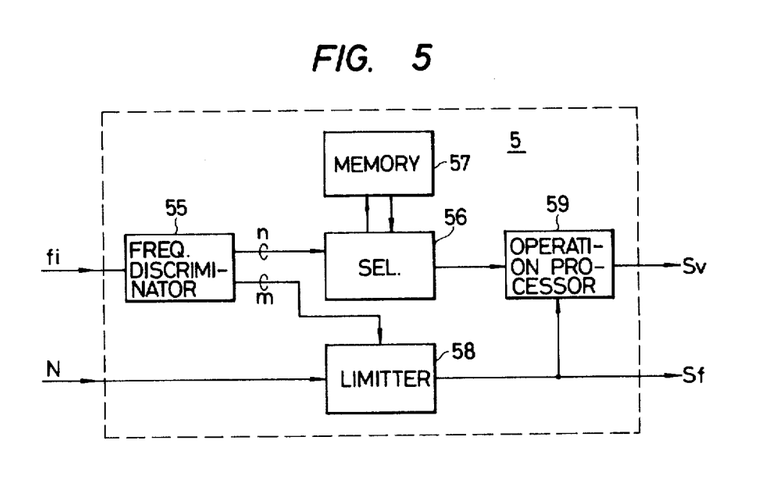
FIGS. 5 through 7 are block diagrams of different embodiments of a control signal generator circuit as shown in F THE PREFERRED EMBODIMENT Now, the inverter for the motor controller of this invention will be explained with reference to the attached drawings.

Next, one embodiment of the control signal generator circuit 5 is shown in FIG. 5. In this figure reference number 55 represents a frequency detector, 56 a selecting circuit, 57 a memory, 58 a limiter and 59 an arithmetic and logic circuit.

The frequency detector 55 takes in the input frequency signal fi and generates the maximum frequency control signal m and a selection signal n.

The selection circuit 56 reads out the constants either $(a, b)_{50}$ for 50 Hz or $(a, b)_{60}$ for 60 Hz from the memory 57 based on the selection signal n and sets the constants in the arithmetic and logic circuit 59.

The limiter 58 limits the maximum value of the speed setting signal N to either 50 Hz or 60 Hz according to the maximum frequency control signal m.

The arithmetic and logic circuit 59, using either constants $(a, b)_{50}$ or $(a, b)_{60}$ set by the selection circuit 56 and the frequency control signal Sf, operates upon the equation (1) to produce a voltage control signal Sv which causes the inverter unit 2 to generate the output voltage Vo according to the output frequency fo.

Thus, with the control signal generator circuit 5 of FIG. 5, it is always possible to obtain the frequency control signal Sf and the voltage control signal Sv required to control the rotation speed of IM 3 under the constant torque even when the input frequency of the ac power supply changes to 50 or 60 Hz. In addition, since the maximum frequency control signal m is input to the limiter 58 to control the maximum value of the frequency control signal Sf to an appropriate value so that the output frequency fo will not exceed the input frequency, the maximum value of frequency of the power supplied to the IM 3 is automatically controlled at the value equal to the input frequency thereby preventing the rotation speed of IM 3 from exceeding the rated speed.

Among the systems using an IM, there is a system in which the speed setting signal also serves as an IM starting signal. In such systems, when a speed setting signal N is given, it may be desirable that the output frequency fo rise from a low value and converge to the frequency corresponding to the maximum speed set by the signal N.

Figure 6:
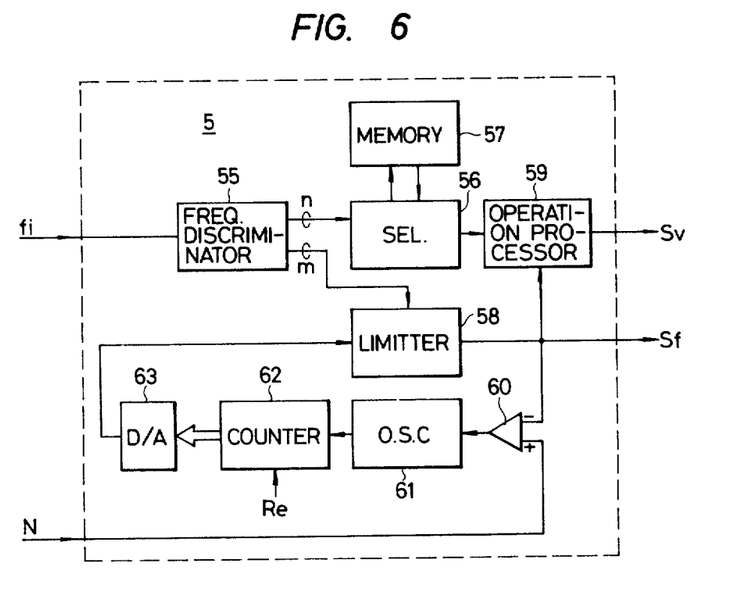

FIG. 6 shows one embodiment suitable for such case. In this figure, reference number 60 represents a comparator circuit, 61 a clock generator, 62 a counter and 63 a digital/analog convertor (D/A) with other component devices identical to those shown in FIG. 4.

The clock generator 61 oscillates and supplies a clock signal to a counter 62 only when the output of the comparator circuit 60 is high.

The D/A 63 converts the output of the counter 62 into the analog frequency control signal Sf.

Now, suppose a speed setting signal N of a certain amplitude is supplied. This makes the output of the comparator circuit 60 high starting the oscillation of the clock generator 61. The output data of the counter 62 increases with the lapse of time and the output voltage of the D/A 63 also increases linearly. As a result, the frequency control signal Sf also increases linearly causing the output frequency fo supplied to the IM 3 (see FIG. 4) to gradually increase from almost zero Hz at a certain rate (this is determined arbitrarily by the frequency of the clock signal). At the same time the output voltage Vo also gradually increases, so that there is a small inrush current at the start of IM 3 resulting in stable acceleration of the IM at a constant torque. In this way a smooth start of the motor is obtained.

As the frequency control signal Sf reaches a value equal to the speed setting singal N, the output of the comparator circuit 60 reverses to a low level. At this point, the clock generator 61 stops, halting the incrementation of the counter 62, with the result that the output frequency fo becomes equal to the value as set by the speed setting signal N thereby holding the rotation speed of the IM 3 to the set value.

In addition to the same effect as obtained by the previous embodiment of FIG. 5, this embodiment has the advantage that by giving a desired speed setting signal N to IM 3 when it is at rest it is possible to smoothly start the motor. Re is a resetting terminal of the counter 62 to which a resetting signal is supplied before starting.

Figure 7:
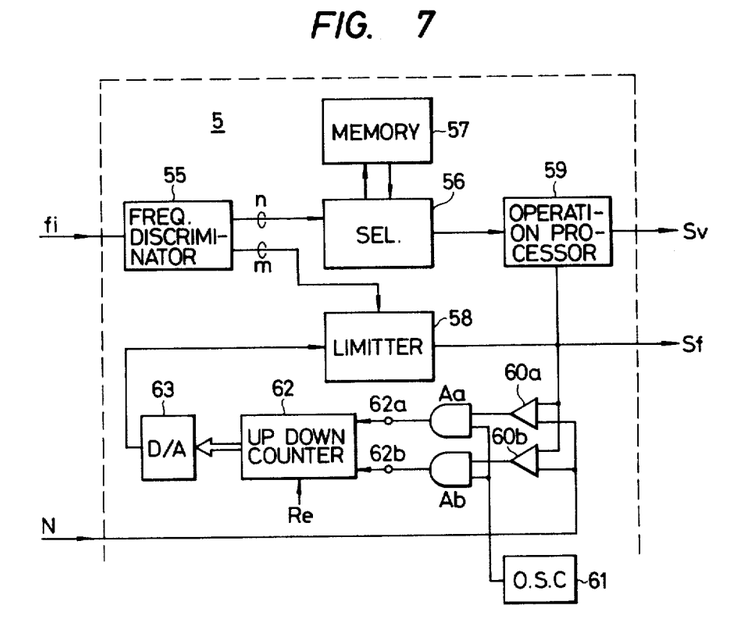

FIG. 7 is still another embodiment of this invention. In this embodiment two comparators 60a, 60b are provided, of which the comparator 60a causes its output to go high when the speed setting signal N is smaller than the frequency control signal Sf, as with the embodiment shown in FIG. 6. The comparator 60b produces an output which goes high when the speed setting signal N is greater than the frequency control signal Sf.

An up/down counter is used as a counter 62. The output of the clock generator 61 and the output of the comparator 60a are ANDed by the AND gate Aa and the result is sent to the up-count input terminal 62a of the up/down counter.

The output of the clock generator 61 and the output of the comparator 60b are ANDed by the AND gate Ab and the result is fed to the down-count input terminal 62b. This enables the changing of the speed setting signal N from high to low value during the motor operation.

Figure 8:
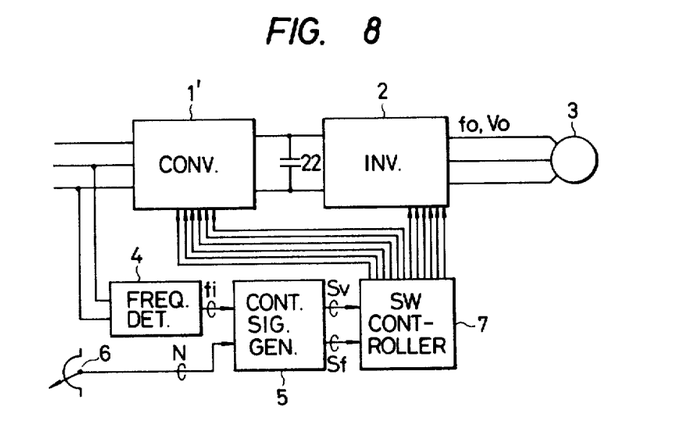

FIG. 8 shows yet another embodiment of this invention. In this embodiment the rectifier unit 11 has a switching means as that shown in FIG. 2. The switching control circuit 7 gives to the invertor unit 2 a switching signal necessary to make the output frequency equal to fo and also applies to the rectifier unit 1 a switching signal to vary the output voltage Vo according to the output frequency fo.

Figure 9:
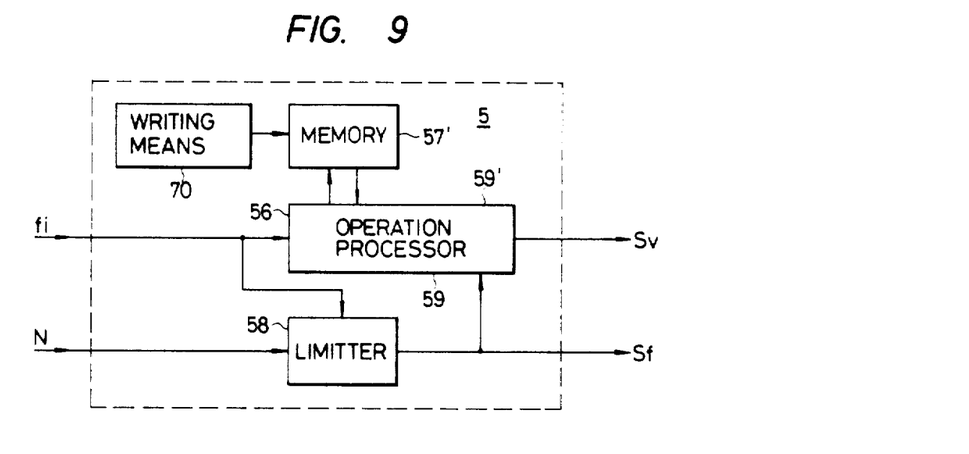

The control signal generator circuit 5, as shown in FIG. 9, has a writing means 70 to write the rated voltage Vc of IM and the value of constant b into the memory 57'.

The arithmetic and logic operation means 59' takes in the rated voltage Vc and the constant b from memory 57' and also the input frequency fi from the frequency detecting circuit 4 to calculate the value of constant a using the equation (2). The arithmetic operation means 59' also determines the signal Sv for regulating the output voltage at Vo by substituting into the equation (1) the frequency fo as determined by the revolution number setting signal N. The limiter 58 accepts the speed setting signal N and the input frequency signal fi and then outputs the signal N as the signal Sf when the signal N is smaller than fi, but outputs the signal fi as the signal Sf regardless of the magnitude of the signal N when the signal N becomes greater than fi.

The above construction provides an optimum output frequency versus output voltage characteristic according to the frequency of input voltage, and this characteristic causes the voltage applied to the IM 3 to be equal to the IM's rated voltage when the output frequency becomes equal to the frequency of the supply voltage.

What is claimed:

1. A motor controller comprising: an ac power source, an induction motor, an inverter coupled between the the ac power source and the induction motor for energizing the induction motor in accordance with the output frequency and voltage of the ac power source; a frequency detection means for detecting the output frequency of the ac power source; an arithmetic and logic operation means for performing an operation on the function of the inverter output voltage with respect to the inverter output frequency and for producing an output frequency signal and an output voltage signal; a selection means for selecting a value of constants for the function used in the arithmetic and logic operation according to the output from the frequency detecting means; and a switching control means responsive to the output frequency signal and the output voltage signal for controlling the inverter output frequency and output voltage.

2. A motor controller according to claim 1, wherein the function of the inverter output voltage with respect to the inverter output frequency has the relation $Vo = a \times fo + b$, where Vo is the output voltage, fo is the output frequency, and a and b are constants, and wherein the selection means selects the value of the constants a and b in accordance with the output from the frequency detecting means.

3. A motor controller comprising:
an ac power source;
an induction motor;
frequency converting means coupled between said ac power source and said induction motor for applying power to said induction motor by converting the frequency value and voltage value of said ac power source;
frequency detecting means for detecting the output frequency from said ac power and providing an output signal indicative thereof;
constant value determining means for determining the value of constants in accordance with the output signal from said frequency detecting means;
command signal generating means for individually providing an output frequency command signal and an output voltage command signal so as to obtain an output voltage command value corresponding to an output frequency command value; and
switching control means for controlling the output frequency and the output voltage from said frequency converting means in response to the output frequency command signal and the output voltage command signal from said command signal generating means.

4. A motor controller according to claim 3, wherein said frequency converting means is an inverter.

5. A motor controller according to claim 3, wherein said constant determining means determines the value of two constants a and b, and wherein the output frequency from said frequency converting means is fo, said command signal generating means provides said output voltage command value and said output frequency command value so that the output voltage Vo from said frequency converting means satisfies the relation $Vo = a \cdot fo - b$.

6. A motor controller according to claim 3, wherein said command signal generating means includes limiting means for limiting the maximum value of the output frequency command signal so that the maximum value of the output frequency from said frequency converting means does not exceed the frequency of said ac power source.

7. A motor controller comprising:
- an ac power source;
- an ac motor;
- an inverter coupled between said ac power source and said ac motor for applying power to said ac motor by converting the frequency value and the voltage value of said ac power source;
- frequency detecting means for detecting the output frequency from said ac power source;
- command signal generating means for providing an output frequency command signal and an output voltage command signal, said command signal generating means providing the output voltage command signal through operation of a linear function having a gradient corresponding to the output of the frequency command signal and variable in accordance with the output of the frequency detecting means; and
- switching means for controlling the output frequency and output voltage from said inverter in response to the output frequency command signal and the output voltage command signal from said command signal generating means.

* * * * *